UNITED STATES PATENT OFFICE.

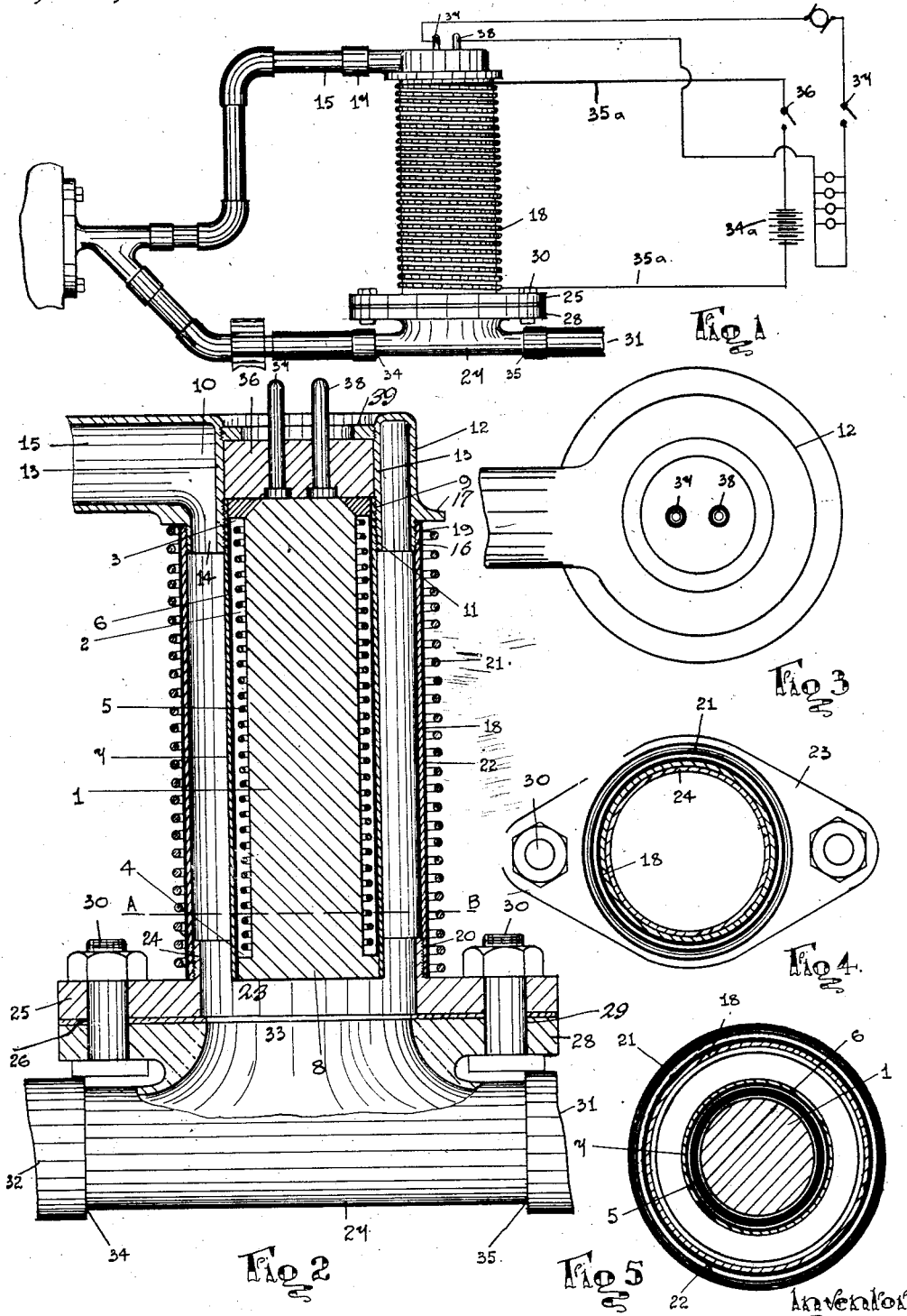

WALTER BERTRAM POWELL, OF QUEBEC, QUEBEC, CANADA.

MOTOR-HEATER AND LIKE DEVICE.

1,304,365.  Specification of Letters Patent.  Patented May 20, 1919.

Application filed January 28, 1918. Serial No. 214,225.

*To all whom it may concern:*

Be it known that I, WALTER BERTRAM POWELL, a subject of the King of Great Britain, and resident of 36 Maple avenue, in the city of Quebec, in the Province of Quebec, in the Dominion of Canada, have invented certain new and useful Improvements in Motor-Heaters and like Devices, of which the following is the specification.

The invention relates to improvements in motor heaters and like devices, as described in the present specification and illustrated in the accompanying drawings that form part of the same.

The invention consists essentially of the novel means employed for warming the engine or surroundings, whereby the water thereabout is electrically heated and circulated.

The objects of the invention are to devise a means of maintaining a motor in proper condition for active service, to avoid the delays and consequent troubles and inconveniences due to the difficulties incident to starting the motor in chilly weather, to facilitate the initial operation of the motor under all conditions and generally to provide a heater and heating system, which is cheap and efficient for general use in motor vehicles or other places.

In the drawings, Figure 1 is a view showing diagrammatically the heater applied to a gasolene motor for warming purposes.

Fig. 2 is an enlarged vertical sectional view of the heater.

Fig. 3 is a plan view of the upper header.

Fig. 4 is a plan view of the lower header.

Fig 5 is a cross sectional view on the line A—B in Fig. 2.

Like numerals of reference indicate corresponding parts in each figure.

Referring to the drawings, the core 1 is shown as having the coil recess 2 forming the shoulders 3 and 4 at the top and bottom ends respectively, said core being preferably made of porcelain and supporting the resistance or heating coil 5 in said recess 2 within the insulation 6.

The inner tube 7 encircles the core 1 and insulation 6 and is here shown as metal though it may be of any suitable heat conducting material.

The tube 7 and core 1 together form a tight joint impervious to water, though the lower end of said tube may be stopped by a separate plug in place of the enlarged end 8 of the core.

At the upper end, said tube 7 is externally threaded at 9 and screws into the mounting 10 in the inner central lower thread 11, said mounting having the outer wall 12 and inner wall 13 forming the annular water chamber 14, from which extends the outlet pipe 15, said outer wall having the external thread 16 beneath the annular flange 17.

The outer tube 18 is internally threaded at the upper and lower ends 19 and 20 and screw on to the external thread 16 of the mounting 10 and is encircled by the resistance or heating coil 21 outside of the insulation 22.

The coupling 23 having the crown 24 externally threaded and the flanges 25 and bolt holes 26 is screwed into the lower end of the outer tube 18.

The three way union 27 is formed with the connecting flange 28 formed with the bolt holes 29, through which the bolts 30 secure it to the coupling 23.

The union 27 has its inlet at 31 and normal outlet at 32 and heater outlet centrally at 33 and is externally formed with the smooth joint ends 34 and 35 adapted for a flexible connector.

The binding post plug 36, having the binding posts 37 and 38 connected to the inner coil 5, is inserted in the mounting 10 and locked therein by the lock nut 39.

The binding posts 37 and 38 are connected to an electrical circuit apart from and foreign to the mechanism contiguous to this device and energized thereby, such as a lighting system in a garage or other housing building.

The inlet 31 of the union 27 is joined by suitable piping to the radiator in motor cars or to the water jacket outlet of an internal combustion engine in other arrangements and the outlet 32 is connected to the pump as customary in motor car practice, but the central outlet 33 leads into the heater, so that as soon as one or other of the heating coils is energized, the flow of the water is diverted and passes up the annular chamber 14 and out through the outlet pipe 15, which is connected to the inlet of the water jacket of the engine.

The outer heating coil is connected to the electric storage battery 34, forming part of the engine or vehicle equipment, by the wires 35, thereby completing a heater circuit within the vehicle made and broken by the switch 36.

The switch 37 beyond the said binding posts controls the connection to the outside circuit mentioned in the foregoing. Consequently each heater coil is independently operated for heating the water in the annular chamber between the tubes.

Briefly the operation of the device is as follows:—

The motor car having this device installed therein is usually laid up for the night in a garage or shed, where the heating facilities are not such as will maintain the engine in a comfortable and warm condition for starting purposes, therefore to avoid the condensations of rich mixtures injected into the machine and the consequent accumulations of expensive oils and greases, where least needed and most to be avoided, it is desirable to keep the engine at an even temperature while out of service.

To accomplish this purpose the inner heating coil, which is wound in accordance with the ordinary lighting system of the garage or house as the case may be, is energized through its connection with said lighting system and the hood covered as usual.

The effect of this is the maintenance of hot water in the water jacket of the engine during the night time or period during which the car is temporarily out of service. It will thus be seen that the usual difficulties incident to the starting a dead cold engine are not in evidence and therefore the flooding of the engine and accumulations of oils and greases do not occur, thereby effecting a great saving, perhaps more than sufficient to offset the electric current consumed to say nothing of the inconvenience avoided.

The outer heating coil is local to the vehicle and wound in accordance with the electrical installation in said vehicle, therefore it can be used with great advantage for short stops, such as may be made in city traveling or otherwise, without making any serious inroad on the storage supply.

Various changes may be made in the construction and arrangement of the parts in this invention also in the uses thereof, so long as they are within the scope of the claims for novelty following.

What I claim is:—

1. In vehicle motor heaters and like devices, an electric heater formed of concentric tubes of different diameters, a mounting forming the top cover of the annular chamber between said tubes and having an outlet, a mounting secured to the lower end and forming a connection in the path of the normal flow of water, a central core within the inner tube and spaced therefrom forming a coil recess, a plug closing in said core and carrying binding posts, a coil in said recess and connected to said binding posts, a coil encircling the outer tube, an electrical system beyond the vehicle and foreign to the motor installation and connected to said binding posts for energizing said inner coil, a local electric circuit including means for energizing and connected to said outer coil and inlet and outlet pipes to and from said annular water chamber and leading to and connected with a water circulating system.

2. In a device of the class described, an annular metal inclosed water chamber having an inlet at the lower end and an outlet at the upper end and surrounding a center of non-conducting material, a heating coil surrounding said center and insulated from said metal inclosure, a heating coil between said metal chamber and said core and insulated from the former, means for energizing one coil apart from the local installation, means for energizing the other coil within the local installation, and pipes connecting said water chamber to a water circulating system.

3. In a device of the class described, an outer tube, an inner tube of lesser diameter, a porcelain core having flanged ends and inserted in said inner tube forming a coil recess between itself and tube, a heating coil in said recess, a mounting having double walls, forming an annular water chamber, and internal and external threads, said tubes being screwed to said mounting and continuing the annular water chamber, a coupling screw threaded in the lower end of said outer tube, a three-way union secured to said coupling and connected to the water cooling system of an engine, a binding post plug carrying system posts connected to said inner coil and to an electric current supply beyond the installation pertaining to the said engine and an outer coil encircling said outer tube and connected to an electric current supply local to the installation pertaining to the aforesaid engine.

4. A motor heater in a vehicle comprising water cooling pipes and jacket, a connection in one of said pipes, a casing mounted on said connection and forming an annular water chamber communicating with said pipes and having an outlet at the upper end connected with said jacket, an inner electric heating coil suitably inclosed, an outer electric heating coil encircling the outer wall of said annular chamber, one of said coils being energized by the vehicle equipment and the other being energized by a power apart from the vehicle equipment and independent from the equipment thereof, the energization of said heating coils, respectively, diverting the flow of the water from its main course for heating purposes.

Signed at Montreal, Canada, this 23rd day of January, 1918.

WALKER BERTRAM POWELL.